(12) United States Patent
DeCecca et al.

(10) Patent No.: US 6,438,323 B1
(45) Date of Patent: Aug. 20, 2002

(54) CAMERA FILM LOADING WITH DELAYED CULLING OF DEFECTIVE CAMERAS

(75) Inventors: Michael L. DeCecca, Fairport; Joseph A. Watkins; Jacob M. Shmois, both of Rochester; Robert J. Blank, Churchville; James J. Parker, Jr., Hamlin, all of NY (US)

(73) Assignee: Eastman Kodak Company, Rochester, NY (US)

( * ) Notice: Subject to any disclaimer, the term of this patent is extended or adjusted under 35 U.S.C. 154(b) by 121 days.

(21) Appl. No.: 09/594,881

(22) Filed: Jun. 15, 2000

(51) Int. Cl.[7] ............................................... G03B 17/02
(52) U.S. Cl. ............................ 396/6; 396/429; 29/705; 29/784
(58) Field of Search ...................... 396/6, 429; 29/700, 29/712, 784, 711, 709, 705, 722, 771

(56) References Cited

U.S. PATENT DOCUMENTS

| | | |
|---|---|---|
| 3,724,162 A | 4/1973 | Lorenzini et al. |
| 3,780,961 A | 12/1973 | Kahwati et al. |
| 3,787,954 A | 1/1974 | Gade et al. |
| 3,802,052 A | 4/1974 | Andler et al. |
| 4,374,451 A | 2/1983 | Miller |
| 4,614,019 A | 9/1986 | Shimizu et al. |
| 4,890,715 A | 1/1990 | Sticht |
| 5,250,979 A | 10/1993 | Wheeler |
| 5,568,715 A | 10/1996 | Ebel et al. |
| 5,606,842 A | 3/1997 | Sakamoto et al. |
| 5,765,042 A | 6/1998 | DeCecca et al. |
| 5,815,911 A | 10/1998 | Hase et al. |
| 5,826,112 A | 10/1998 | Matsushita |
| 6,035,520 A | * 3/2000 | Yamazaki et al. .......... 242/534 |

FOREIGN PATENT DOCUMENTS

| | | |
|---|---|---|
| JP | 2747698 | 2/1990 |
| JP | 8-43902 | 2/1996 |
| JP | 10-148915 | 6/1998 |
| JP | 10-171074 | 6/1998 |

* cited by examiner

Primary Examiner—David M. Gray
(74) Attorney, Agent, or Firm—Robert Luke Walker

(57) ABSTRACT

In a production method and system, a set of camera frame assemblies are partially assembled and a film unit is loaded. Each camera frame assembly is disposed on a pallet. Each pallet has a unique machine-readable designator. Defects are found in one or more members of the set of camera frame assemblies and a record is made of the respective designators of the pallets bearing the camera frame assemblies having defects. Assembly of the camera frame assemblies is then concluded. Afterward, camera frame assemblies on pallets having designators in the record of defects are culled. The assembly has the pallets, a transporter, a plurality of assembly devices, a series of defect inspectors, and an alteration unit that prepares for culling film rolls of camera frame assemblies having defects. The alteration unit transmits camera frame assemblies that are free of the defects without the preparing.

38 Claims, 12 Drawing Sheets

| PALLET NO. 001 | TEST 1 | TEST 2 | CAMERA NO. | CARTRIDGE NO. |

| PALLET NO. 001 | TEST 1 | TEST 2 | CAMERA NO. 101099 | CARTRIDGE NO. |

| PALLET NO. 001 | TEST 1 PASS | TEST 2 | CAMERA NO. 101099 | CARTRIDGE NO. |

| PALLET NO. 001 | TEST 1 PASS | TEST 2 | CAMERA NO. 101099 | CARTRIDGE NO. 22111111 |

| PALLET NO. 003 | TEST 1 PASS | TEST 2 | CAMERA NO. 101105 | CARTRIDGE NO. 22111222 |

| PALLET NO. 003 | TEST 1 PASS | TEST 2 FAIL | CAMERA NO. 101105 | CARTRIDGE NO. 22111222 |

30

| PALLET NO. 003 | TEST 1 PASS | TEST 2 FAIL | CAMERA NO. 101105 | CARTRIDGE NO. 22111222 |

30

CAMERA FILM LOADING WITH DELAYED CULLING OF DEFECTIVE CAMERAS

FIELD OF THE INVENTION

The invention relates to the manufacture of photographic equipment and more particularly relates to methods and systems providing camera film loading with delayed culling of defective cameras.

BACKGROUND OF THE INVENTION

Recyclable cameras, commonly referred to as "single use" or "one-time use" cameras, are becoming increasingly popular in the field of photography. Today's one-time use cameras generally use prewound film. In such cameras, a roll of unexposed photographic filmstrip is contained in a film supply chamber of a light-tight camera body. The filmstrip is sequentially advanced for picture taking, frame by frame across an exposure chamber and into the canister of the film cartridge, which is separately contained in a film cartridge chamber of the camera body. The camera frame assembly includes an anti-backup feature that permits movement of the film in only the advance direction. After all of the exposures have been taken by the camera user, the film cartridge is removed from the film cartridge chamber of the camera body by a photofinisher for processing. The camera body includes a frame sandwiched between front and rear covers. The frame is shaped so as to define the exposure chamber and the film chambers. A majority of the photographic components are attached to the frame. In recycling, the camera frame is commonly reused, since the components attached to the frame, such as the viewfinder and the film advance mechanism, can be reused for a number of film cartridges.

In assembling one-time use cameras, using recycled and new parts, it is desirable to test for defects. Testing can be automated and can be performed during camera assembly. Defective cameras can be removed when tested or can be physically marked for removal at the end of the assembly process. Both approaches have shortcomings. Removing defective cameras immediately, tends to slow down the manufacturing process. Marking for later removal adds a risk that the mark will later be missed. If a defect is unrelated to the film cartridge (otherwise referred to here as a "non-film defect"), then removal of a defective camera after film loading results in an unusable camera loaded with otherwise usable film cartridge. Retrieval of the cartridge from the defective camera frame assembly requires the return of the filmstrip to the canister of the film cartridge while protecting the filmstrip from exposure to light.

It would thus be desirable to provide an improved production method and system in which film cartridges from defective cameras are easily and automatically reclaimed.

SUMMARY OF THE INVENTION

The invention is defined by the claims. The invention, in its broader aspects, provides a production method and system, in which a set of camera frame assemblies are partially assembled and a film unit is loaded. Each camera frame assembly is disposed on a pallet. Each pallet has a unique machine-readable designator. Defects are found in one or more members of the set of camera frame assemblies and a record is made of the respective designators of the pallets bearing the camera frame assemblies having defects. Assembly of the camera frame assemblies is then concluded. Afterward, camera frame assemblies on pallets having designators in the record of defects are culled. The assembly has the pallets, a transporter, a plurality of assembly devices, a series of defect inspectors, and an alteration unit that prepares for culling film rolls of camera frame assemblies having defects. The alteration unit transmits camera frame assemblies that are free of the defects without the preparing.

It is an advantageous effect of the invention that an improved production method and system is provided in which film cartridges from defective cameras are easily and automatically reclaimed at the end of film winding and other production and testing steps.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 9A:
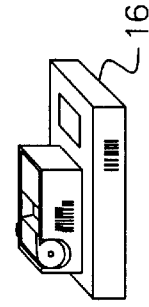
FIGS. 9a–9c are the same views as FIGS. 7e–7g, but show a defective camera.
Figure 9B:
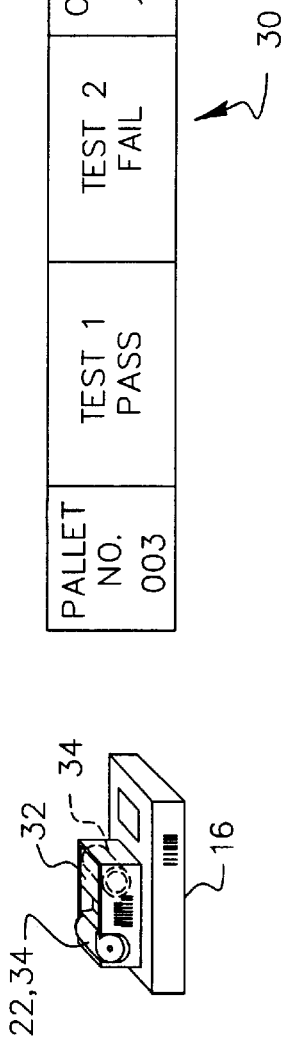
Figure 9C:
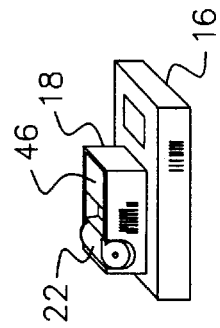

In the production method and system 10, cameras are assembled, loaded with film cartridges 22, and tested for defects. The system 10 has components divided among a number of different stations 12. A transporter 14 conveys pallets 16 carrying camera frame assemblies 18, from station 12 to station 12. The term "camera frame assembly" is used here to refer to a complete camera or an incomplete camera or subunit of a camera that will later be assembled with other parts to form a complete camera. At the stations 12 of the first portion 20 of the system 10, camera frame assemblies 18 and film cartridges 22 are loaded onto pallets 16. In the second portion 24 of the system 10, the transporter 14 extends through a light-tight enclosure, also referred to herein as a "dark enclosure 28". (The light tight enclosure 28 is indicated by a dashed line in some of the figures.) At the stations 12 of the second portion 24 of the system 10, film is prewound and the camera frame assemblies 18 are rendered light-tight. At the stations 12 of the third portion 26 of the system 10, the completed cameras are sorted. Camera frame assemblies 18 are tested for defects in one or more portions 20,24,26 of the system 10 and defective camera frame assemblies 18 are culled following the sorting. Camera frame assemblies 18 identified as being defective, while within the dark enclosure 28, cannot be removed unless provision is made to protect other camera frame assemblies 18 within the dark enclosure 28 from admission of light. This is undesirable, since it would add delay and complexity. Camera frame assemblies 18 identified as being defective, while within the dark enclosure 28, and, optionally, while in the first portion 20 of the system 10 are therefore left in the queue. Instead of being removed, pallets 16 bearing camera frame assemblies 18 having defects are indicated in a defect record 30 (illustrated in FIGS. 9a–9c) and are removed at the end of assembly. The pallets 16 after removal of cameras are returned to the first portion 20. This procedure is indicated, in the figures, by arrows 31,33 and can be provided by any conventional means, including manual transport of empty pallets.

Figure 2:
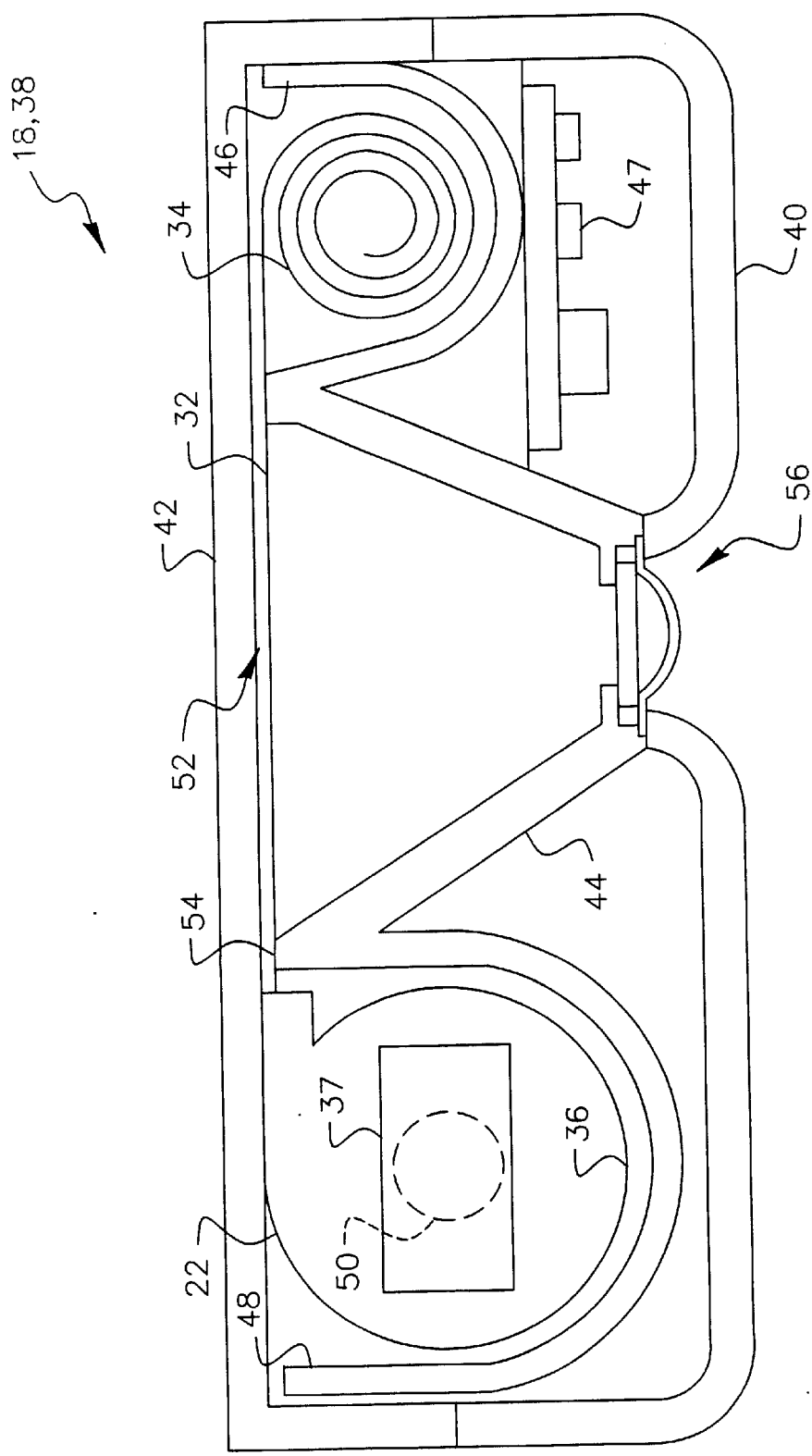
FIG. 2 is a semi-diagrammatical cross-sectional view of a one-time-use camera produced by the method of FIG. 1.

The method and system 10 are used for cameras in which a filmstrip 32, prewound into a roll 34, is advanced back into the canister 36 of a film cartridge 22 during use, by a film transport (illustrated as box 37 in FIG. 2). FIG. 2 illustrates one embodiment of a one-time-use camera 38. The camera 38 has a front cover 40, a back or back cover 42, and a frame unit 44 located between covers 40,42. During camera 38 use, a first film chamber 46 can contain a coreless film roll 34 or can have a film roll 34 held by a spool (not illustrated). A 30 second film chamber 48, during use, holds the film cartridge 22. The end of the filmstrip 32 is attached to a cartridge spool 50 within the canister 36. A thumbwheel 51 is joined to the cartridge spool 50. The frame unit 44 defines a film path (indicated by arrow 52 in FIG. 2) along which the photographic filmstrip 32 travels as the filmstrip is advanced during use. The film path extends from the first film chamber 46, across an intermediate section 54 to the second film chamber 48. The intermediate section 54 includes an exposure area to which light is directed by an exposure unit 56. The exposure unit 56 includes sub-components such as a baffle, a lens system, a shutter, and a shutter release (not separately illustrated). The camera 38 can include a variety of other well-known camera features. For example, the intermediate section 54 can include frame rails for supporting the film during camera use. Discrete camera constituents, such as, a flash system 47, a viewfinder, and a battery (not separately illustrated); can also be installed in the camera during assembly.

The transporter 14 conveys the pallets 16 from station 12 to station 12. In the first portion 20 of the system 10, the transporter 14 can be linear or can be arranged in two or more branches 58. The transporter 14 combines the two or more branches 58 at an intersection 60. The use of multiple branches 58 accommodates differences in processing speed of different portions 20,24,26 of the system 10. The system 10 is illustrated and generally described herein in relation to an embodiment having two branches 58 in the first portion 20 and unbranched second and third portions 24,26. It will be understood that the number of branches 58 in the different portions 20,24,26 can be varied, in any combination, to meet the process speed limitations of particular embodiments.

In the second portion 24 of the system 10, the filmstrips 32 are prewound out of the film cartridges 22 and into film rolls 34, within the dark enclosure 28. The camera frame assemblies 18 are light-tightly closed over the film rolls, transported out of the dark enclosure 28, and completed. The film 32 is protected, by the dark enclosure 28, from actinic light during film winding and closure of the camera frame assemblies 18. The method can be fully automated or can have one or more manual steps. The transporter 14 moves the pallets 16 from station 12 to station 12, but is otherwise not critical.

Figure 3:
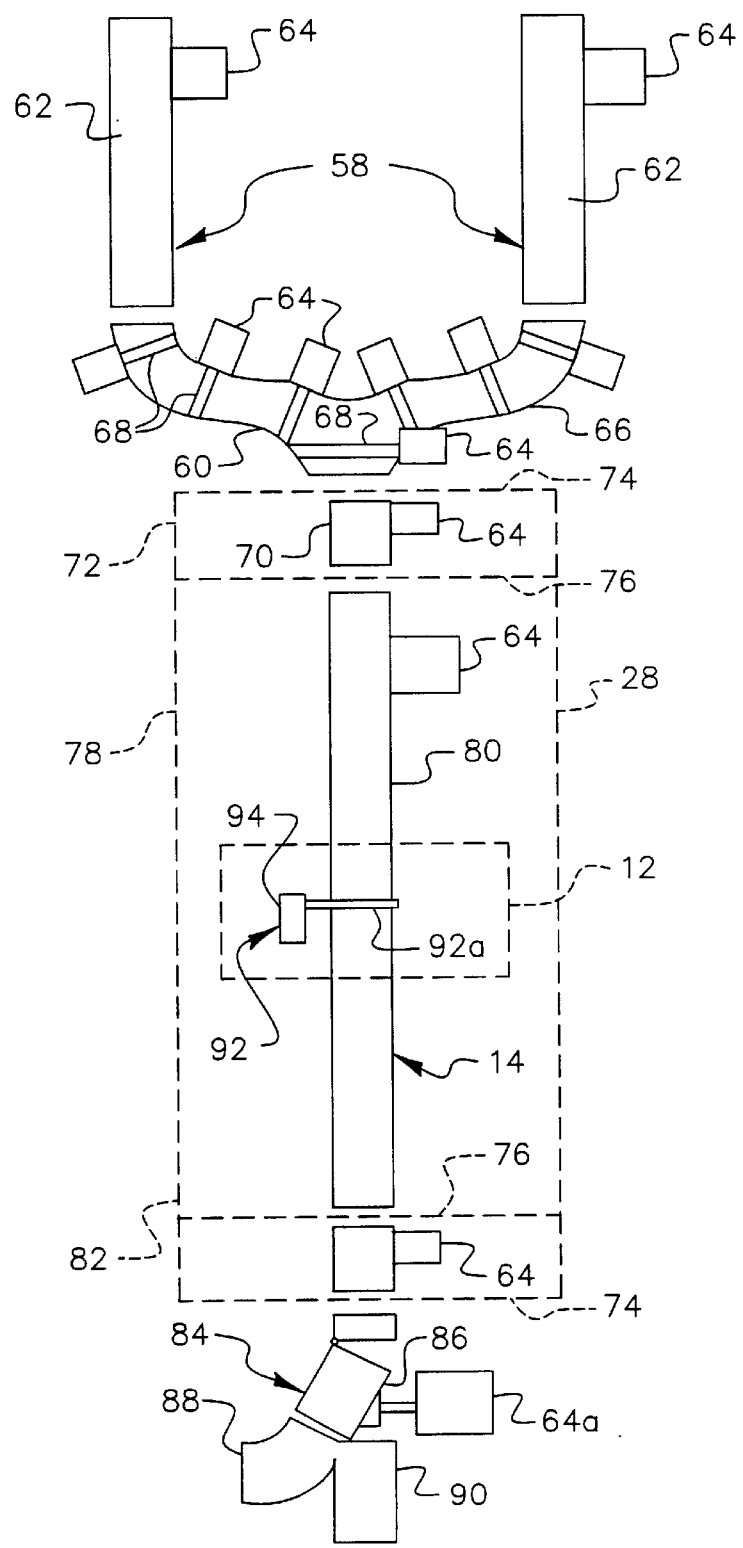
FIG. 3 is a semi-diagrammatical view of the transporter of the production system of FIG. 1.

FIG. 3 illustrates one embodiment of the transporter 14. In the first portion 20 of the system 10 are a pair of spaced apart conveyer belts 62. Each belt 62 is driven by a motor 64. Motors 64 for conveyer belts 62 and other components are indicated by boxes in FIG. 3. The two conveyer belts 62 lead into a low friction chute or table 66. Powered rollers 68 propel the pallets 16 along the chute 66 toward and then through the intersection 60. The table can have nonpowered rollers or skids or the like (not shown) to reduce friction and more easily allow for movement of the pallets 16 and can be inclined to provide a gravity assist.

The intersection 60 of the first portion 20 of the transporter 14 delivers pallets 16 to a stub conveyer belt 70 within an entry section 72 of the dark enclosure 28. Outer and inner doors 74,76 (indicated by dashed lines) of the entry section 72 are alternately opened and closed to permit pallets 16 to pass through, and yet exclude light from the main section 78 of the dark enclosure 28. The stub conveyor belt 70 leads to a main conveyor belt 80 within the main chamber. The dark enclosure 28 has an exit chamber 82 beyond the main section 78. The exit chamber 82 includes a stub conveyer belt 70 and inner and outer doors 76,74 which function in the same manner as like features of the entry section 72. The intersection 60, stub conveyer belts 62 and a main conveyer belt 80 within the main section 78 of the dark enclosure 28, are all positioned close enough together for the pallets 16 to bridge gaps through which the doors 74,76 move (not shown).

Beyond the dark enclosure 28, in the third portion 26 of the system 10, is a chute or table 84 that has a swingable gullet 86 that provides for selective movement of pallets 16 between a first outlet 88 for non-defective camera frame assemblies 18 and a second outlet 90 for defective cameras, as referred to herein as "culls". In the embodiment shown in FIG. 3, a linear motor 64a swings the gullet 86 between the two different outlets 88,90. The chute 84 can operate by gravity or can have a powered roller or other propulsion device (not shown).

The movement of the pallets 16 along the transporter 14 is coordinated as required by the components of the stations 12 and can be intermittent or continuous. If desired, pallets 16 can be located within stations 12 by stops 92. A stop is illustrated in FIG. 3 for one of the stations 12 (indicated by a dashed box) by a swingable bar 92a and associated drive 94. Suitable components for the transporter 14 are well-known to those of skill in the art. The transporter 14 can also be simplified is desired, by leaving out motors 64, and instead providing manual movement of the pallets 16 from station 12 to station 12, in all or only part of the system 10. For example, in the embodiment shown in FIG. 3, the conveyers can be replaced by tables and the pallets can be moved manually from one station to another along the tables. Both chutes can be unpowered and can operate by gravity, with or without a manual assist.

Figure 1:
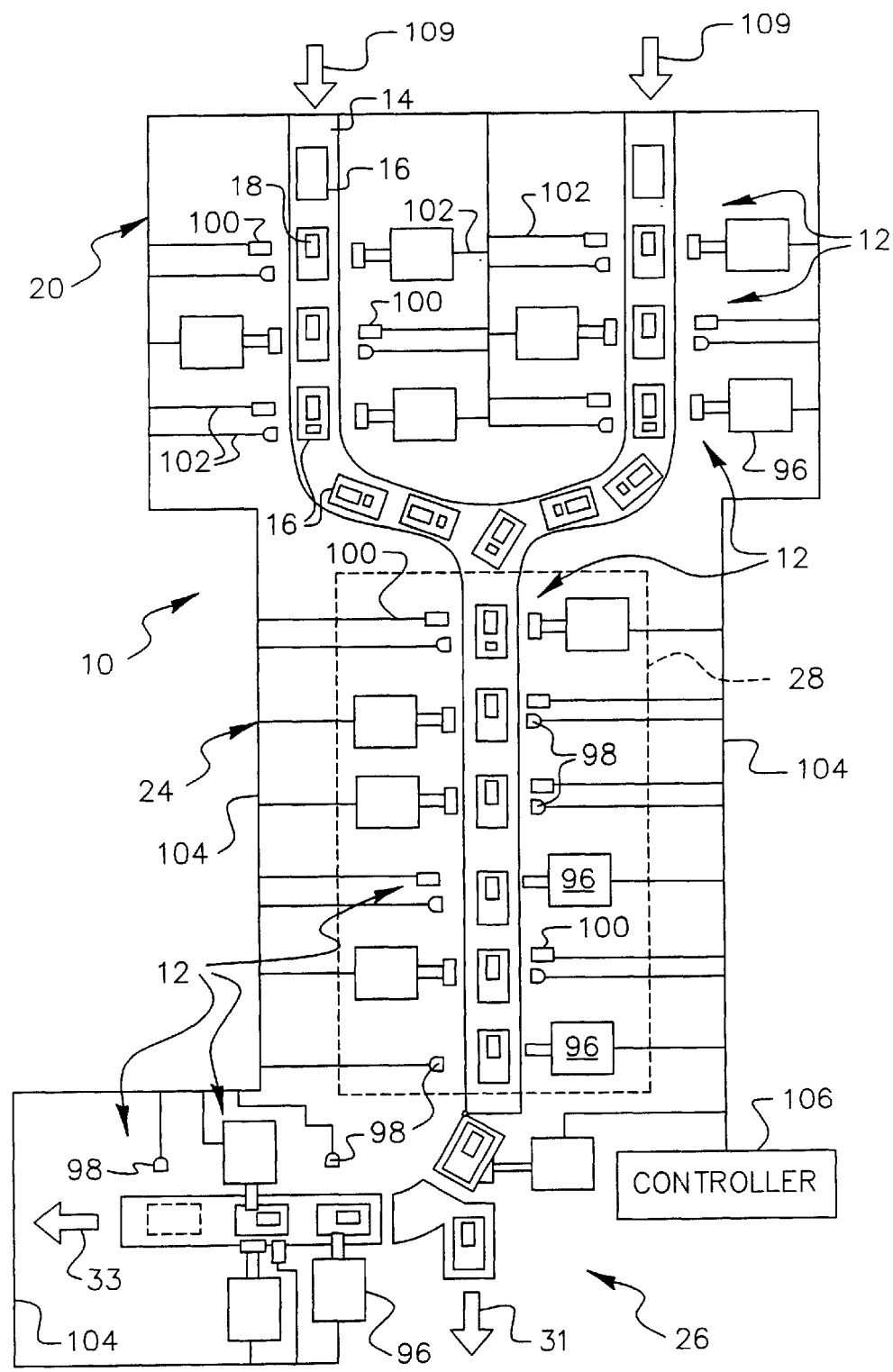
FIG. 1 is a semi-diagrammatical view of an embodiment of the production system which performs an embodiment of the method.

Referring now particularly to FIG. 1, each of the stations 12, except at the ends, is illustrated as having an active component 96, a reader 98, and an tester 100. This is a matter of convenience in illustrating the system 10. The various components 96,98,100 are provided at the different stations 12 as necessary to meet system 10 requirements. Each of the components 96,98,100 can include an actuation mechanism (not illustrated), such as a retraction-extension system for moving the respective component between a non-use position, in which the component is clear of the transporter, and a use or active position, in which a pallet 16 in the respective station 12 is accessible to the component. The actuation mechanism can also include other parts, such as rotary or linear drives, for imparting motion to components or parts of the camera frame assemblies or film cartridges.

Each of the components 96,98,100 is connected by a communication line 102 to a trunk 104 which then extends to a controller 106. The trunk 104 can be a wiring harness connecting each of the in individual components, or the trunk 104 can be a common line for multiplexed or networked signals. The controller 106 can be a programmable logic controller or personal computer.

In the method, pallets 16 are placed on the transporter 14, as indicated by arrows 109. Camera frame assemblies 18, that is, incomplete camera bodies, are then placed on respective pallets 16. Film cartridges 22 are placed on the pallets 16 with the camera frame assemblies 18. The two streams of pallets 16 are then brought together at the intersection 60. The order of the pallets 16 leaving the intersection 60 can be indeterminate. In other words, pallets 16 need not be provided by the two branches 58 at the same rate and the rate for each branch 58 can vary with time. This is likely, for example, if the steps of the first portion 20 of the system 10 are done manually. After pallets 16 enter dark enclosure 28, the film cartridge 22 is placed in the camera frame assembly 18 and the film is prewound out of the cartridge 22. A back 42 is then placed over the camera frame assembly 18 light tightly closing the camera frame assembly 18. The pallets 16 then leave the dark enclosure 28.

At each station 12, one or more parts are assembled and one or more functions are tested or both assembly and testing is performed. The pallets 16 each have a machine readable indicator 108, which uniquely identifies the individual pallet 16. The term "machine readable indicator" is inclusive of any form of information that can be detected without human intervention, including optical, magnetic, radio frequency, and tactile information. Symbols or alphanumeric indicators can be used, but it is generally more convenient to provide the indicator in the form of a pallet bar-code 108. Suitable pallet bar-code 108 symbologies and appropriate readers are well known to those of skill in the art.

Figure 10:
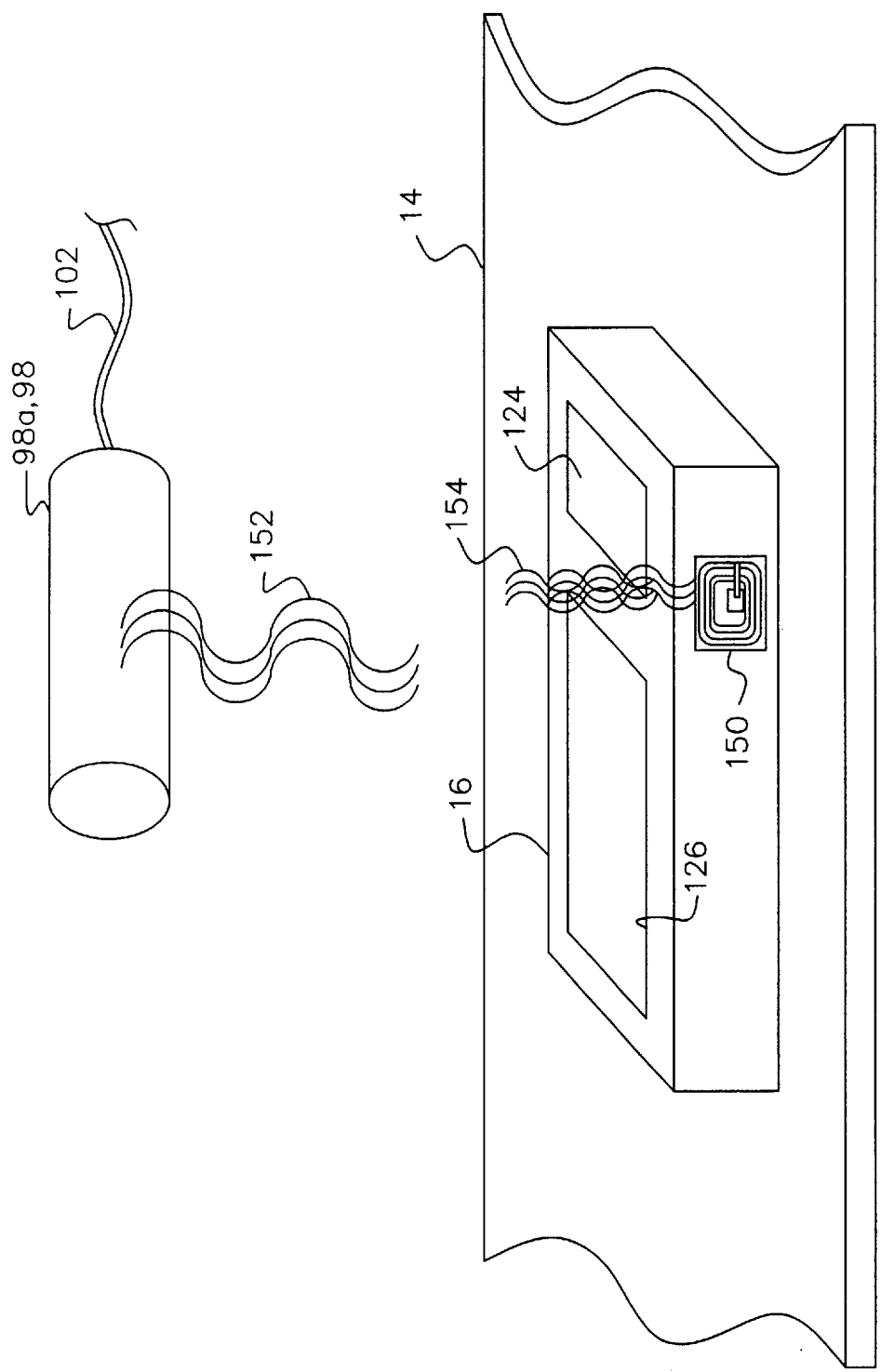
FIG. 10 is a semi-diagrammatical perspective view of a portion of another embodiment of the production system. A pallet and reader are shown.

Referring now particularly to FIG. 10, another type of indicator that can be used is a radio frequency identification transponder 150. The term "radio-frequency identification transponder" is used herein to refer to any of a class of compact radio receiver-transmitters which are powered by an ambient radio-frequency field. The transponder is accessed by modulating the field with an appropriate communication signal (indicated by wave pattern 152 in FIG. 10) from a reader 98,98a, in the form of a radio frequency transmitter-receiver. The transponder reacts, responsive to the communication signal and supplies an identification number or alphanumeric sequence or other indicator as a radio-frequency transmission (indicated by wave pattern 154 in FIG. 10). Radio-frequency identification transponders are widely available in a variety of forms. These devices include a non-volatile memory, such as an EEPROM (Electrically Erasable Programmable Read-Only Memory) semiconductor component integrally contained in the transponder. Stored in the non-volatile memory are encoded data. Particularly convenient are inlay transponders that have a substantially flat shape. The antenna for an inlay transponder is in the form of a conductive trace deposited on a non-conductive support. The antenna has the shape of a flat coil or the like. Leads for the antenna are also deposited, with non-conductive layers interposed as necessary. Memory and any control functions are provided by a chip mounted on the support and operatively connected through the leads to the antenna. Inlay transponders have been used as layers of identification tags and labels to provide encodements that are accessible at a distance. Inlay transponders of this type are marketed by Texas Instruments Incorporated, of Dallas, Tex. as Tag-it™ Inlays. FIG. 10 illustrates a pallet bearing an inlay transponder.

For convenience, pallet indicators are generally identified herein as "pallet bar-codes 108" and the reader 98 optically reads the pallet bar code, but it will be understood that other types of indicators and readers could also be used such as those shown in FIG. 10.

The pallet bar-codes 108 are read at some or, preferably, all of the stations 12. Information determined about the camera frame assembly 18 and film cartridge 22 carried by the pallet 16 is sent to the controller 106 and is associated with the pallet bar-code 108 for that pallet 16, in a memory unit (not separately illustrated) of the controller 106. For convenience, the collected information is referred to herein as a "table".

The camera frame assemblies 18 are illustrated as bearing identifiers 110, in the form of bar-codes, at an early stage of the assembly process. Because the pallet bar-codes 108 are used to register information in the table, the camera identifiers 110 can be added whenever convenient. Defective cameras can be unnumbered, allowing continuous numbering of identifiers 110 of cameras packaged together for distribution. Monitoring is easier, since camera identifiers 110 can be provided in continuous blocks of numbers. The use of pallet bar-codes 108 also avoids any problems that could result from using film cartridge identifiers 112 to also identify cameras, such as possible confusion during reuse of film cartridges from defective cameras.

The tabulated information about each pallet 16 is used in culling defective camera frame assemblies 18 at the completion of the process. This is a particularly advantageous approach, in that testing can be provided in the dark enclosure 28, without requiring access for culling of defective camera frame assemblies 18 at that time. Defective camera frame assemblies 18 can instead be tested for defects within the dark enclosure 28 and then be culled later after completing the assembly process. In the first portion 20 of the system 10, camera frame assemblies 18 can be tested and defective camera frame assemblies 18 can be easily removed, since it is easy to do so within the daylight environment. On the other hand, the first portion 20 of the system 10 can be simplified by eliminating the removal of defective camera frame assemblies 18. In this case, the camera frame assemblies 18 are tested, defects are recorded, and defective camera frame assemblies 18 are then allowed to continue through the assembly process for culling at the end. This approach also helps ensure the integrity of information in the controller. All pallets 16 enter and leave the system 10 only at the beginning and end, and all pallets 16 within the system 10 are continuously tracked in the table.

Figure 8:
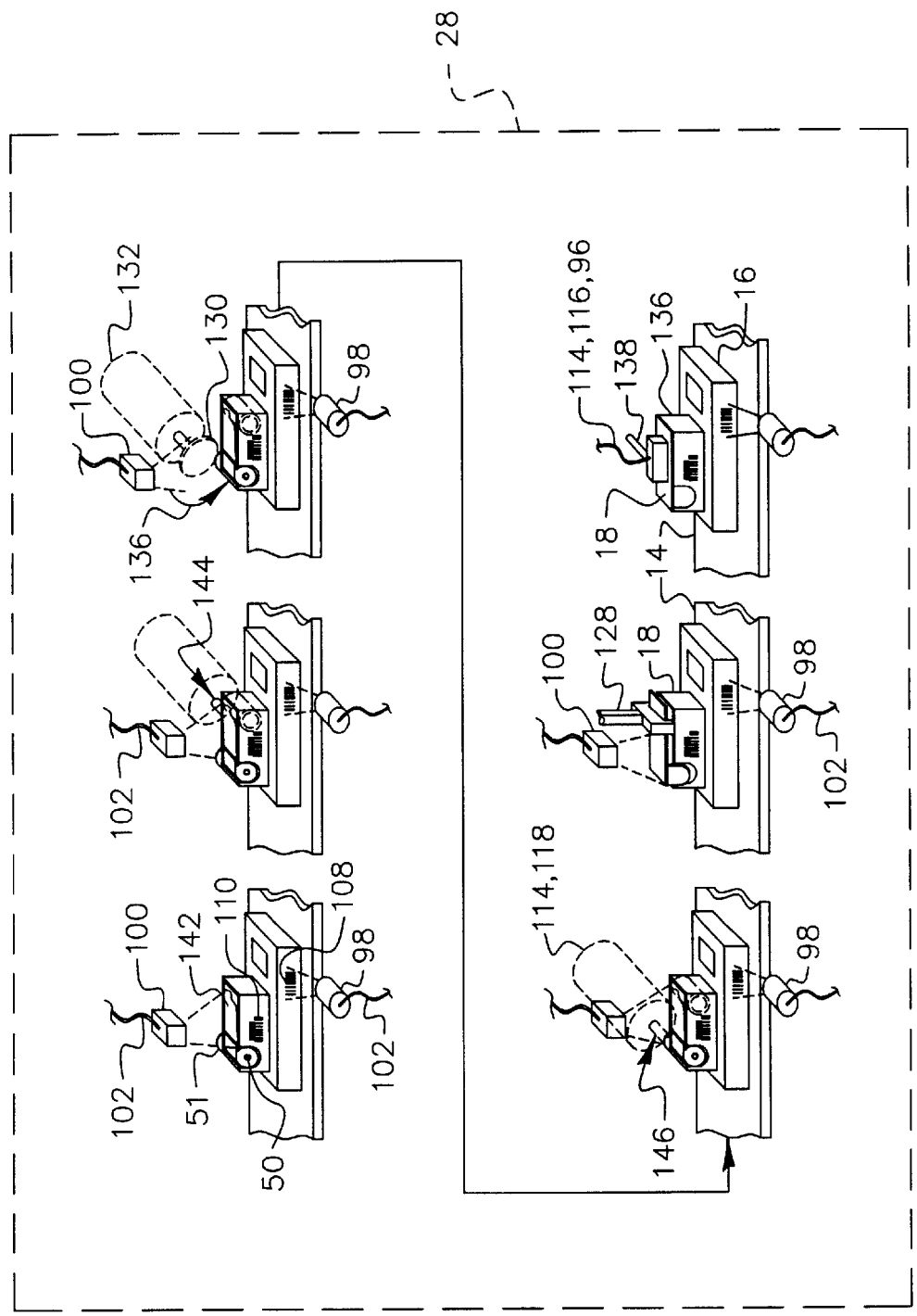
FIG. 8 is an enlarged semi-diagrammatical view of some steps of the second stage of the embodiment of the method of FIG. 1.

Access to camera frame assemblies 18 within the dark enclosure 28 is necessarily limited by the requirement that the film be protected from actinic light. As earlier indicated, this limited access to the dark enclosure 28 is accommodated, in the case of culls, by removing defective camera frame assemblies 18 later, using information recorded in the table. The limited access can also be used to help ensure that one or more alteration units 114 are not bypassed. Referring to FIG. 8, alteration units 114 are individual active components 96 or groups of active components that act only on defective camera frame assemblies 18 or act in a different manner on defective and non-defective camera frame assemblies 18. The actions of alteration units 114 modify the completed defective camera frame assemblies to be different than the completed defect-free camera frame assemblies and are initial steps in the reclamation of reusable parts of the defective camera frame assemblies. In the embodiments disclosed herein, an alteration unit 114 includes a camera printer 116 and a film cartridge rewinder 118.

The printer 116 prints defect indicators 120 (shown in FIGS. 5–6) on the outsides of camera frame assemblies 18, for use in classifying defective camera frame assemblies 18 for recycling of usable parts and monitoring of production. The printer 116 can optionally print an identifier 112 of the film cassette in the camera, on the outside of the camera. The cassette identifier 112 can be human or machine readable and is illustrated as a bar code.

The film cartridge rewinder 118 rewinds film 32 from a film roll 34 back into the film canister 36 of the cartridge 22. This rewinding is only done with defective camera frame assemblies 18. This occurs within the dark enclosure 28, thus when the defective camera frame assemblies 18 leave the dark enclosure 28, the defective camera frame assemblies 18 can be opened and the film cartridges 22 can be removed in daylight for later reuse. For Advanced Photo System film cartridges, the rewinder 118 can include an active light lock closer (not shown). A closer can also be provided as part of the camera frame assemblies or active light locks can be closed manually within the dark enclosure after rewinding.

Figure 4:
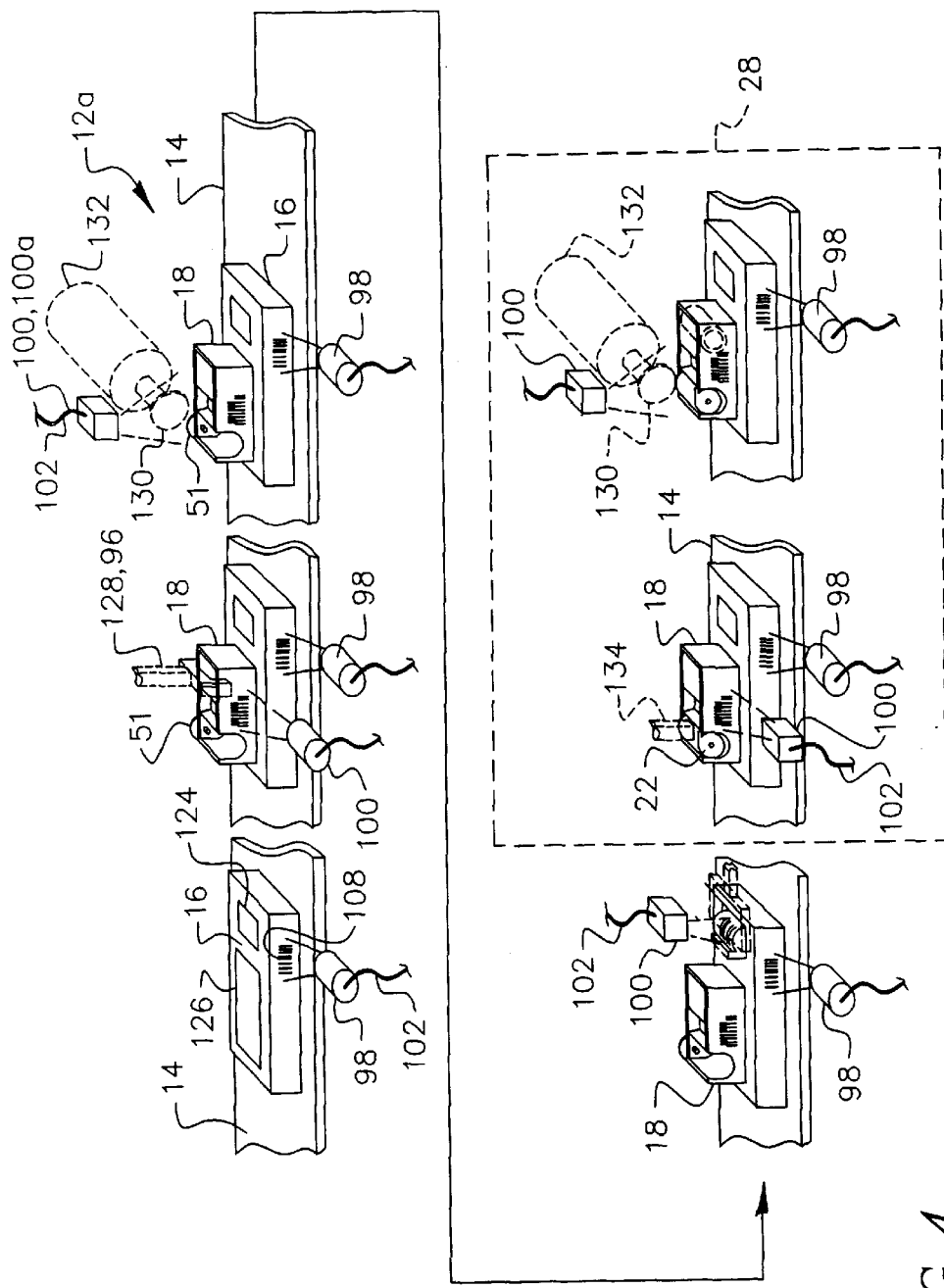
FIG. 4 is an enlarged semi-diagrammatical view of some steps of the first and second stages of the embodiment of the method of FIG. 1.
Figure 5:
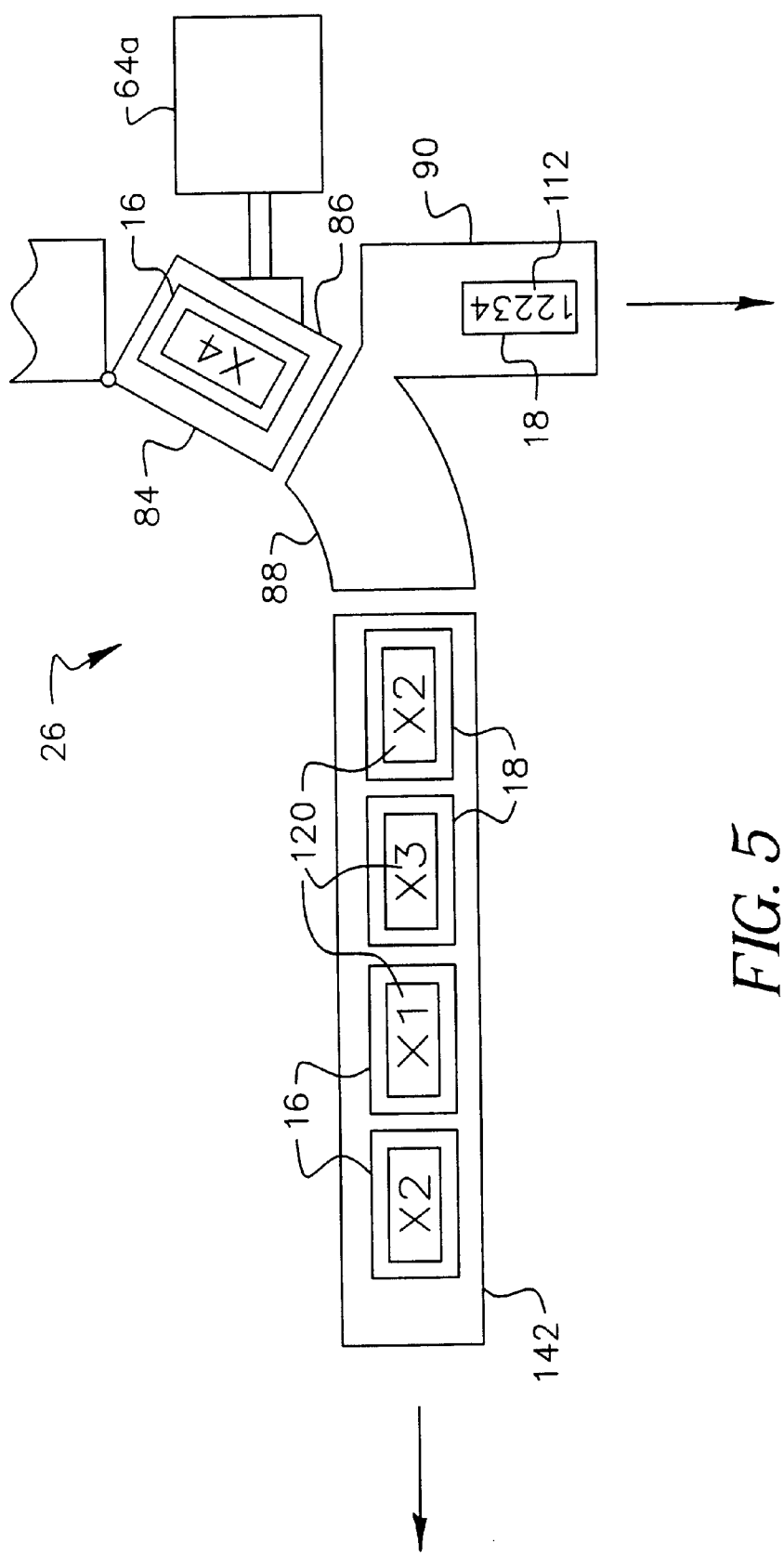
FIG. 5 is an enlarged, partial semi-diagrammatical view of another embodiment of the system having a modified unloading portion which performs another embodiment of the method.
Figure 6:
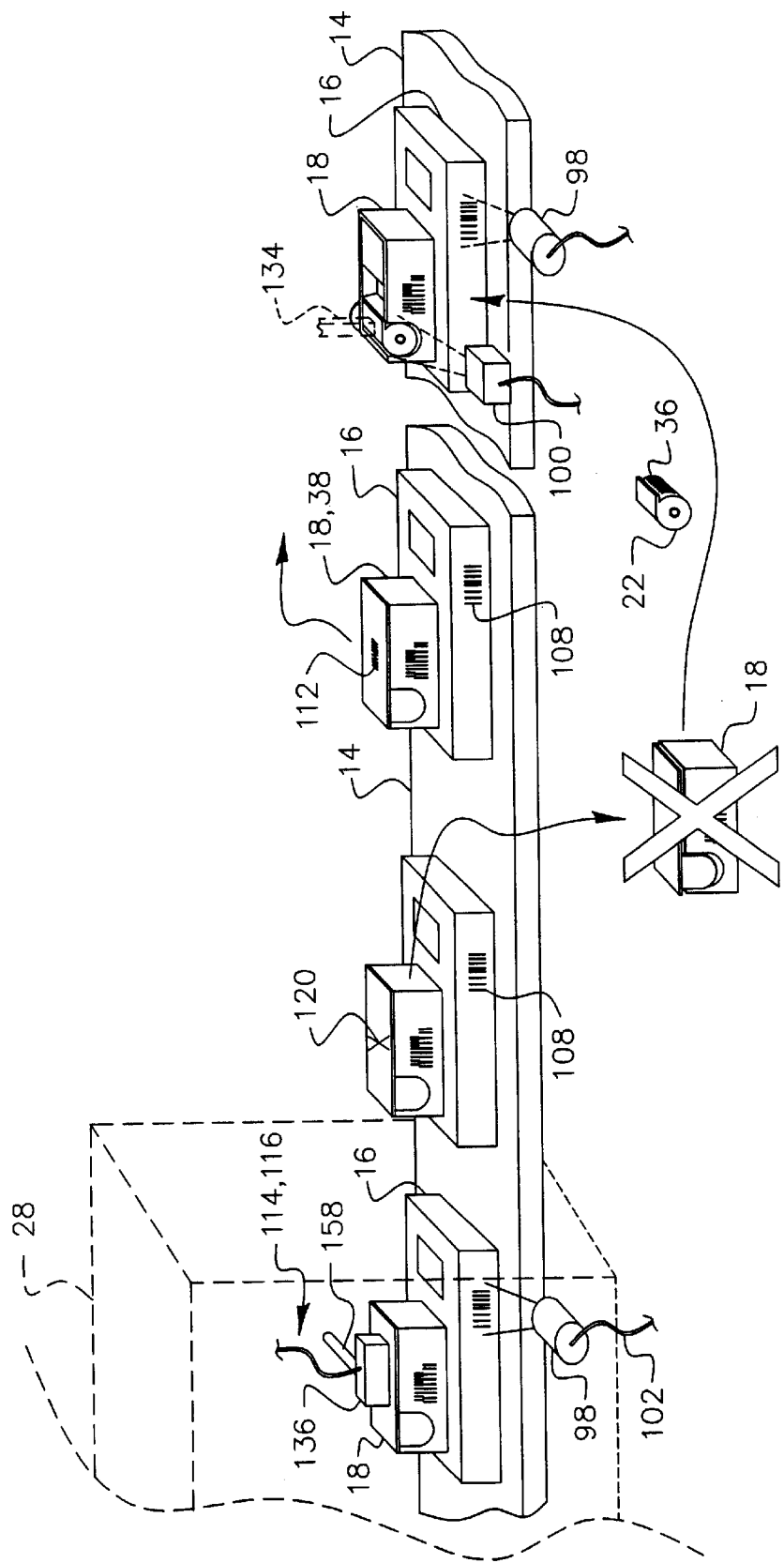
FIG. 6 is an enlarged semi-diagrammatical view of some steps of the second and third stages of the method of FIG. 5.

The operation of the printer 116 and rewinder 118 are illustrated in simplified form, in the figures. Referring now particularly to FIGS. 4–8, an empty pallet 16 is initially placed on the transporter 14 and pallet bar-code 108 on the pallet 16 is read. The pallet 16 has nests 124,126 (illustrated as recesses) for a camera frame assembly 18 and a film cartridge 22. An entry is created in the table in the controller 106, indicating the identity of the pallet 16. Entries are shown in the figures as words and numbers, but can be recorded in any form. Information can be compressed or encoded and absent entries can also be used to indicate default values. A camera frame assembly 18 is placed on the pallet 16 by a pick-and-place device 128. (A clamping tool and part of an arm of this active component are illustrated.) A pallet bar-code 108 on the camera frame assembly 18 is read and that information is entered in the table in association with the pallet 16 number, as shown in FIG. 6b.

Additional assembly operations can be performed at this time and tests undertaken. This is illustrated by a station 12a (shown in FIG. 4) in which rotation of the thumbwheel 51 is checked. A rotatable disk 130 driven by a motor 132 is brought into contact with the edge of the thumbwheel 51 and rotation is monitored by a tester 100, such as an optical sensor. The disk 130 engages the rim of the thumbwheel 51. The disk 130 can be toothed complementary to the thumbwheel or knurled or otherwise configured to provide a positive engagement with the thumbwheel 51. Marks can be provided on the thumbwheel 51 to make it easier for the sensor 100a to detect movement of the thumbwheel 51. Motion can alternatively be detected by a change in the load on the motor 132. Suitable equipment to perform these functions is well known to those of skill in the art. A camera frame assembly 18 is considered defective, if the thumbwheel rotates with the application of a force that exceeds a predetermined value. The sensor 100a sends a signal to the controller 106, which records in the table an entry indicating whether the camera frame assembly 18 is acceptable or defective. (Test results are indicated in the table shown in FIGS. 7a–7j and 9a–9c, by the terms "Pass" and "Fail".) A film cartridge 22 is next placed on the pallet 16 by a put-and-place device 128. An identifier 112 on the film cartridge 22 is read at this time and that information is entered in the table, as shown in FIG. 6d. The pallet 16 then enters the dark enclosure 28 and additional assembly and testing operations are undertaken.

In the dark enclosure 28, the film cartridge 22 is placed in the camera frame assembly 18 by an installation device 134. The station 12 is illustrated in FIG. 4, as also having a sensor 100 that detects whether the cartridge 22 is seated in the camera frame assembly 18. This test could provide a signal to the table in the controller 106, but is not illustrated as doing so in the figures. The installation device can be a simple pick-and-place device or can also provide additional functions, such as opening a light lock door of an Advanced Photo System 10™ film cartridge 22. These and other functions can also be provided by a combination of manual and automated stations.

In the dark enclosure 28, assembly operations and testing are performed and the camera frame assembly 18 reaches the state, in which the leading portion 142 of the filmstrip 32 extends out of the canister 36. Type 135 (35 mm) film cartridges 22 are in this state, as manufactured. Advanced Photo System 10 film cartridges 22 reach this state after the light lock door is opened and the leading portion of the filmstrip 32 is thrust outward. The leading portion 142 is attached to a mandrel 144 and the film roll 34 is wound. Sensors 100 detect the presence and required motions of the filmstrip 32.

The operation of the thumbwheel 51 is tested and test results are signalled to the controller 106, in the same manner as earlier described. There is a distinction in the two tests, in that the spool 50 of the film cartridge 22 is also tested for rotation in the second test. For this reason, it is preferred that the thumbwheel 51 be rotated, in this second test, only in the direction of thrusting the filmstrip 32 from the cartridge 22. The direction of rotation of the disk 130 is indicated by an arrow 136. The thumbwheel 51 can be rotated in either direction in the first test. In both cases, the camera frame assembly 18 does not have a functioning anti-backup mechanism. It is well known in the art to place an anti-backup mechanism on a later assembled part, such as a back cover 42, or to defeat a previously assembled anti-backup mechanism using a tool. The results of the test, indicated as "Test 2" in the figures, are signalled to the controller 106.

Figure 7A:
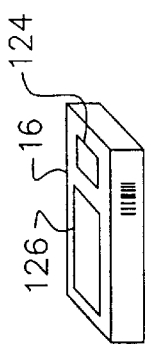
FIGS. 7a–7j are semi-diagrammatical views of a pallet and camera frame assembly and corresponding look-up table entries at different steps of the method of FIG. 1.
Figure 7B:
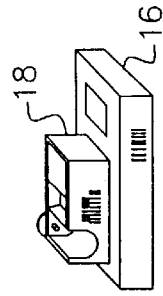
Figure 7C:
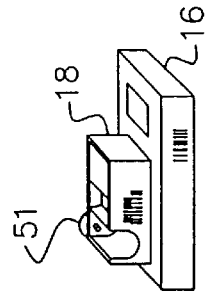
Figure 7D:
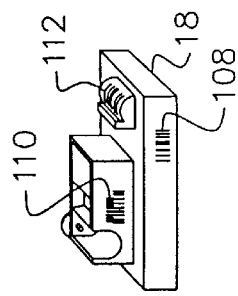
Figure 7E:
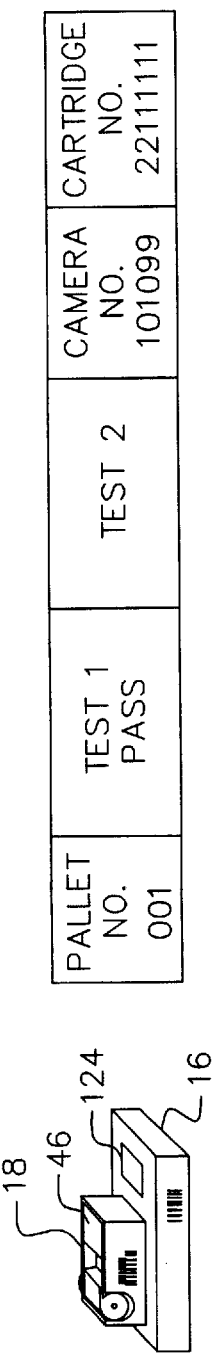
Figure 7F:
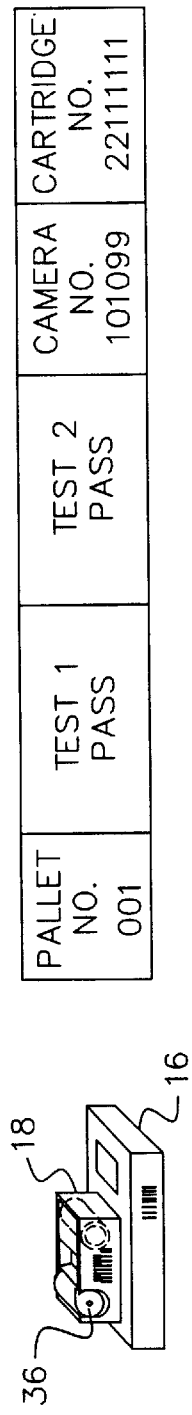
Figure 7G:
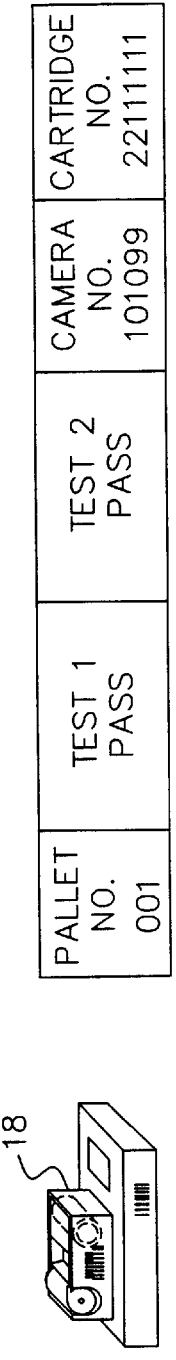
Figure 7H:
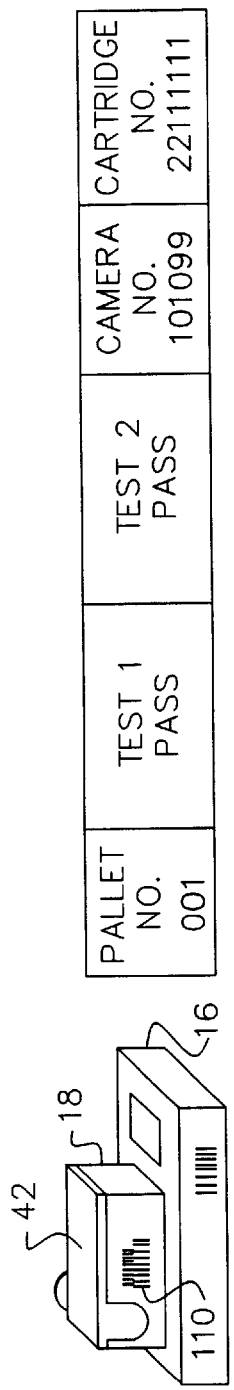
Figure 7I:
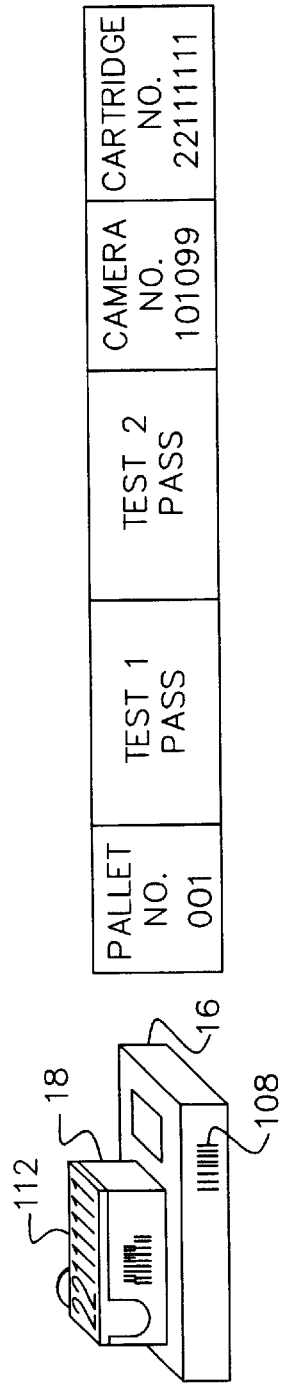
Figure 7J:
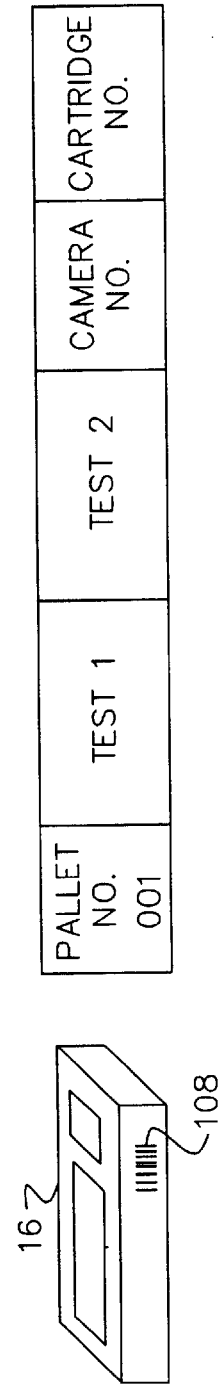

Additional assembly steps and testing are undertaken to complete the camera. FIGS. 7f–7h illustrate prewinding of the filmstrip 32 out of the canister 36 of the film cartridge 22 and into a film roll 34 and installation of the back cover 42.

Referring now particularly to FIG. 6, the camera frame assemblies 18 are printed within the dark enclosure 28 by a print head 136 of the printer 116. An ink jet print head 136 on a movable arm 138 is illustrated, but any type of printer 116 can be used. Labels can also be individually printed separately then attached (not illustrated). The latter approach is useful with complexly shaped camera bodies. In any case, it is preferred that when the camera frame assemblies 18 leave the dark enclosure 28, defective camera frame assemblies 18 have printed defect indicators 120, such as codes for particular defects, as shown in FIG. 5. The defect-free camera frame assemblies 18, in the embodiment shown in FIGS. 5–6 are printed with the identifier 112 of the film cartridge 22 before the camera frame assemblies 18 leave the dark enclosure 28. Defective camera frame assemblies 18 can be printed with film cartridge identifiers 112 in addition to defect indicators 120, but this is not useful and, is not preferred if there is any risk that the film cartridge indicator 112 could cause a mix-up of defective and defect-free camera frame assemblies 18. In the third portion 26 of the system 10, as shown in FIG. 6, defective camera frame assemblies 18 are culled and defect-free camera frame assemblies 18 are sent onward for additional handling, such as inspection, packaging, and the like. In FIG. 5, the output chute 84 delivers defect free camera frame assemblies 18 for further processing (indicated by arrow) and delivers defective camera frame assemblies 18 to a table 142 for manual sorting, reclamation of usable components, and disposal or recycling of remaining parts (indicated by arrow). In the embodiment shown in FIG. 1, automated stations perform the same activities and defect indicators 120 are usable, but unimportant.

Referring now to FIGS. 1–2 and 7a–9c, the filmstrip 32 of the film cartridge 22 is wound out of the canister in the second portion 24 of the system 10 in the dark enclosure 28. In doing so, a main part of the filmstrip 32 is wound into a film roll. The film roll is housed in the camera and is protected from light, in the finished camera, by the camera frame assembly 18. Film cartridges 22 can be reclaimed from defective camera frame assemblies 18, but the filmstrip 32 must first be rewound into the canister 36 without exposing the filmstrip 32 to actinic light. The film rewinder 118 rewinds the filmstrips 32 of only the defective camera frame assemblies 18. At a downstream station 12, the bar code of the pallet 16 is read and the value obtained is compared to the defect record 30, that is, a record in the table that indicates that the camera on a particular pallet 16 has one or more defects. If the pallet 16 is found in the defect record 30, then a quill 146 engages the spool 50 of the film cartridge 22 and the filmstrip 32 is rewound back into the canister 36. If the pallet 16 is not in the defect record 30, then the filmstrip 32 is not rewound. In any case, the camera is completed, including installing the back, and, optionally, printing cartridge 22 identifiers and/or defect indicators as earlier described.

The invention has been described in detail with particular reference to certain preferred embodiments thereof, but it will be understood that variations and modifications can be effected within the spirit and scope of the invention.

What is claimed is:

1. A production method comprising the steps of:
   partially assembling a set of camera frame assemblies, each said camera frame assembly being disposed on a pallet, each said pallet having a unique machine-readable designator;
   during said partially assembling, loading a film unit into each said camera frame assembly;
   prior to said loading, finding defects in one or more members of said set of camera frame assemblies;
   making a record of the respective said designators of said pallets bearing said camera frame assemblies having said defects;
   concluding assembly of said camera frame assemblies; and
   following said making and concluding, culling said camera frame assemblies on respective said pallets having said designators in said record.

2. The method of claim 1 wherein said culling includes reading said designators.

3. The method of claim 2 wherein said culling further comprises, following said reading, printing a defect marker on said camera frame assemblies on respective said pallets having said designators in said record.

4. The method of claim 3 wherein each said film unit has a unique machine-readable identifier and said method further comprises finding a subset of said camera frame assemblies that are free of said defects and printing respective said identifiers on said subset of said camera frame assemblies.

5. The method of claim 1 wherein each said film unit has a unique machine-readable identifier and said method further comprises finding a subset of said camera frame assemblies that are free of said defects and printing respective said identifiers on said subset of said camera frame assemblies.

6. The method of claim 1 wherein said film unit includes a filmstrip and a light-shield blocking light from said filmstrip and said method further comprises:
   prior to said concluding, clearing each said light-shield from at least part of the respective said filmstrip; and
   prior to said culling, restoring said light-shields of the respective said filmstrips of said camera frame assemblies on respective said pallets having said designators in said record.

7. The method of claim 6, further comprising during said clearing, finding, making, concluding, and restoring, continuously protecting said filmstrips from actinic light independent of respective said light-shields.

8. The method of claim 1 wherein said partially assembling further comprises preparing first and second sequences of said camera frame assemblies in tandem and combining said first and second sequences into a combined sequence.

9. The method of claim 8 wherein said combining of said first and second sequences is in indeterminate order.

10. A production method comprising the steps of:
    partially assembling a plurality of camera frame assemblies;
    during said partially assembling, associating a film unit with each said camera frame assembly, said film unit including a filmstrip and a light-shield blocking light from said filmstrip;
    loading said film units into respective said camera frame assemblies,
    clearing each said light-shield from at least part of the respective said filmstrip;
    following said clearing, concluding assembly of the respective said camera frame assemblies;
    identifying ones of said camera frame assemblies having defects;
    following said clearing and identifying, restoring said light-shields of the respective said filmstrips of said camera frame assemblies having defects; and
    during said clearing, identifying, and restoring, continuously protecting said filmstrips from actinic light independent of respective said light-shields.

11. The method of claim 10 further comprising culling said camera frame assemblies having defects following said restoring.

12. The method of claim 11 further comprising, during said culling, removing said film cartridges from said camera frame assemblies having defects; and, following said removing, assembling a new plurality of camera frame assemblies including said removed film cartridges.

13. The method of claim 10 further comprising printing a defect marker on said camera frame assemblies having defects.

14. The method of claim 13 wherein said continuously protecting further comprises continuously keeping each said camera frame assembly in a light-tight enclosure during said clearing, concluding, identifying, restoring, and printing.

15. The method of claim 10 wherein said clearing further comprises prewinding said filmstrip into a film roll and said restoring further comprises rewinding said filmstrip.

16. The method of claim 15 wherein said continuously protecting further comprises continuously keeping each said camera frame assembly in a light-tight enclosure during said prewinding, concluding, identifying, and rewinding.

17. The method of claim 15 further comprising closing said camera frame assembly after said prewinding.

18. The method of claim 17 wherein said rewinding is after said closing.

19. The method of claim 17 wherein said rewinding is prior to said closing.

20. The method of claim 10 further comprising holding said camera frame assemblies on individual pallets during said partially assembling, associating, loading, clearing, concluding, identifying, restoring, and protecting.

21. The method of claim 20 wherein each said pallet has a unique machine-readable designator and said identifying further comprises:

making a record of the respective said designators of said pallets bearing said camera frame assemblies having defects; and prior to said restoring, checking the respective said designator of each said pallet against said record.

22. The method of claim 21 wherein said checking further comprises illuminating said designators with non-actinic radiation and detecting returning non-actinic radiation modulated by respective said designators.

23. The method of claim 21 further comprising, after said rewinding, removing said film cartridges from said camera frame assemblies having defects, displacing said camera frame assemblies having defects from respective said pallets and eliminating said record.

24. The method of claim 10 wherein said partially assembling further comprises preparing first and second sequences of said camera frame assemblies in tandem and combining said first and second sequences into a combined sequence.

25. The method of claim 24 wherein said combining of said first and second sequences is in indeterminate order.

26. The method of claim 25 further comprising the steps of:

holding said camera frame assemblies on individual pallets during said partially assembling, associating, loading, clearing, concluding, identifying, restoring, and protecting, said pallets each having a unique machine-readable designator;

recording the respective said designators of said pallets bearing camera frame assemblies having said defects to create a defect record; and prior to said restoring, comparing the respective said designators of said pallets against said defect record to ascertain said camera frame assemblies having defects.

27. The method of claim 26, further comprising following said restoring, removing said camera frame assemblies from said pallets and eliminating respective said designators from said defect record.

28. A production system for producing camera frame assemblies loaded with prewound filmstrips, said apparatus comprising:

a set of pallets, each said pallet being capable of bearing an individual said camera frame assembly;

a plurality of assembly devices, said assembly devices receiving said pallets and together assembling said camera frame assemblies on said pallets and loading film cartridges into said camera frame assemblies;

a series of inspectors disposed in operative relation to a plurality of said assembly devices, said inspectors identifying ones of said camera frame assemblies having defects and ones of said camera frame assemblies free of said defects;

an alteration unit receiving each of said pallets, said alteration unit preparing said film rolls of said camera frame assemblies having defects for culling, said alteration unit transmitting said camera frame assemblies free of said defects without said preparing;

a film winder; and a transporter moving said pallets in sequence by said assembly devices, said film winder, and then said alteration unit.

29. The system of claim 28 wherein each said pallet has a unique machine-readable designator, said inspectors each have a reader that reads respective designators of said pallets bearing said camera frame assemblies having defects, and said alteration unit has a reader that reads said designators of each said pallet.

30. The system of claim 29 wherein each said pallet includes a radio-frequency transponder supplying the respective said machine-readable designator.

31. The system of claim 29 wherein said system further comprises a controller, said controller generating a record of said respective designators of said camera frame assemblies having defects and comparing said designators read by said alteration unit reader to said record.

32. The system of claim 28 wherein said transporter is open to resequencing of said pallets before said alteration unit.

33. The system of claim 28 wherein said transporter is branched before said alteration unit.

34. The system of claim 28 wherein said alteration unit further comprises a film rewinder receiving each of said pallets, said film rewinder rewinding said film rolls of said camera frame assemblies having defects back into respective said cartridges, said film rewinder transmitting said camera frame assemblies free of said defects without rewinding.

35. The system of claim 34 further comprising an enclosure protecting said film rolls from actinic radiation in said film winder and film rewinder.

36. The system of claim 28 wherein said alteration unit further comprises a printer receiving each of said pallets, said printer printing defect markers on said camera frame assemblies having defects.

37. The system of claim 36 further comprising a reader disposed to read identifiers printed on said film cartridges, and wherein said reader is operatively connected to said printer, and said printer prints said identifiers of respective said film cartridges on said camera frame assemblies free of said defects.

38. A production method comprising the steps of:

partially assembling a set of camera frame assemblies, each said camera frame assembly being disposed on a pallet, each said pallet having a unique machine-readable designator;

during said partially assembling, loading a film unit into each said camera frame assembly, each said film unit having a unique machine-readable identifier;

finding defects in one or more members of said set of camera frame assemblies and a subset of said camera frame assemblies that are free of said defects;

making a record of the respective said designators of said pallets bearing said camera frame assemblies having said defects;

concluding assembly of said camera frame assemblies; and following said making and concluding, culling said camera frame assemblies on respective said pallets having said designators in said record;

wherein said culling includes:

reading said designators;

following said reading, printing a defect marker on said camera frame assemblies on respective said pallets having said designators in said record; and printing said identifiers of respective said film units on said subset of said camera frame assemblies that are free of said defects.

* * * * *